(12) United States Patent
Bruballa et al.

(10) Patent No.: US 12,106,548 B1
(45) Date of Patent: Oct. 1, 2024

(54) BALANCED GENERATIVE IMAGE MODEL TRAINING

(71) Applicant: Shutterstock, Inc., New York, NY (US)

(72) Inventors: Raúl Gómez Bruballa, Dublin (IE); Alessandra Sala, Dublin (IE)

(73) Assignee: Shutterstock, Inc., New York, NY (US)

( * ) Notice: Subject to any disclaimer, the term of this patent is extended or adjusted under 35 U.S.C. 154(b) by 0 days.

(21) Appl. No.: 18/618,982

(22) Filed: Mar. 27, 2024

(51) Int. Cl.
*G06V 10/774* (2022.01)
*G06N 3/0475* (2023.01)
*G06V 20/70* (2022.01)

(52) U.S. Cl.
CPC .......... *G06V 10/774* (2022.01); *G06V 20/70* (2022.01)

(58) Field of Classification Search
None
See application file for complete search history.

(56) References Cited

U.S. PATENT DOCUMENTS

| | | | | |
|---|---|---|---|---|
| 2023/0121564 A1* | 4/2023 | Zou | ............ | G06N 3/09 706/12 |
| 2023/0154235 A1* | 5/2023 | Zhao | ............ | G06N 3/09 382/118 |
| 2024/0144000 A1* | 5/2024 | Roh | ............ | G06N 3/08 |

OTHER PUBLICATIONS

Grover, Aditya, et al. "Bias correction of learned generative models using likelihood-free importance weighting." Advances in neural information processing systems 32 (2019). (Year: 2019).*
Teo, Christopher TH, Milad Abdollahzadeh, and Ngai-Man Cheung. "FairTL: a transfer learning approach for bias mitigation in deep generative models." IEEE Journal of Selected Topics in Signal Processing (2024). (Year: 2024).*
Xu, Depeng, et al. "Fairgan: Fairness-aware generative adversarial networks." 2018 IEEE international conference on big data (big data). IEEE, 2018. (Year: 2018).*

* cited by examiner

*Primary Examiner* — Sean M Conner
(74) *Attorney, Agent, or Firm* — McDermott Will & Emery LLP

(57) ABSTRACT

A method for training a generative image model, including defining multiple sensitive categories and protected attributes associated with multiple training images, determining for a particular sensitive category a distribution of a protected attribute within the training images, and based on the distribution, calculating for each training image a corresponding image debiasing weight value associated with the protected attribute. The method further includes generating annotated training data including the training images, and for each training image, (1) the corresponding image debiasing weight value associated with the protected attribute and (2) a corresponding descriptive text caption. The method further includes performing a training process using the annotated training data to train a generative image model resulting in a trained model. A contribution of each image in the training images to an optimization loss of the training process is weighted during the training process using the corresponding image debiasing weight value.

20 Claims, 8 Drawing Sheets

BALANCED GENERATIVE IMAGE MODEL TRAINING

TECHNICAL FIELD

The present disclosure generally relates to generative image models, and more particularly to training of debiased image generative models.

BACKGROUND

The data requirements to train machine learning and/or artificial intelligence (AI) image generation models are immense, involving very large training image datasets. However, all generative AI models have inherent biases and imbalances that are representative of and inherited from the image datasets they are trained on. Since the social impact of generative AI is potentially large, it is important to ensure that the generated data distribution doesn't replicate or augment sensitive biases, by amplifying stereotypes (e.g., gender stereotypes, racial stereotypes, etc.).

Studies have demonstrated that current image generation models do suffer from these biases (e.g., Leonardo Nicoletti and Dina Bass, "Bloomberg Analysis of Stable Diffusion," https://www.bloomberg.com/grahics/2023-generaative-ai-bias/, retrieved Jan. 17, 2024). Image sets generated for every high-paying job were dominated by subjects with lighter skin tones, while subjects with darker skin tones were more commonly generated by prompts like "fast-food worker" and "social worker." For each image depicting a perceived woman, almost three times as many images were generated of perceived men. Most occupations were dominated by men, except for low-paying jobs like housekeeper and cashier. Men with lighter skin tones represented the majority of subjects in every high-paying job, including "politician," "lawyer," "judge" and "CEO." The biases in image generation models are worse than reality, with women being underrepresented in high-paying occupations and overrepresented in low-paying ones, and overrepresenting people with darker skin tones while underrepresenting people with lighter skin tones in low-paying fields.

As such, there is a need for optimizing the training of generative image models to counter sensitive biases.

SUMMARY

According to some embodiments, a method for training a generative image model includes defining a plurality of sensitive categories associated with a plurality of training images; defining a plurality of protected attributes associated with the plurality of training images; determining, for a particular sensitive category, a distribution of at least one protected attribute within the plurality of training images; based on the distribution, calculating for each image in the plurality of training images a corresponding image debiasing weight value associated with the at least one protected attribute; generating annotated training data comprising the plurality of training images and further comprising, for each image in the plurality of training images, (1) the corresponding image debiasing weight value associated with the at least one protected attribute and (2) a corresponding descriptive text caption; and performing a training process using the annotated training data to train a generative image model resulting in a trained model, wherein a contribution of each image in the plurality of training images to an optimization loss of the training process is weighted during the training process using the corresponding image debiasing weight value.

According to some embodiments, a non-transitory computer-readable medium stores a program for training a generative image model, which when executed by a computer, configures the computer to: define a plurality of sensitive categories associated with a plurality of training images; define a plurality of protected attributes associated with the plurality of training images; determine, for a particular sensitive category, a distribution of at least one protected attribute within the plurality of training images; based on the distribution, calculate for each image in the plurality of training images a corresponding image debiasing weight value associated with the at least one protected attribute; generate annotated training data comprising the plurality of training images and further comprising, for each image in the plurality of training images, (1) the corresponding image debiasing weight value associated with the at least one protected attribute and (2) a corresponding descriptive text caption; and perform a training process using the annotated training data to train a generative image model resulting in a trained model, wherein a contribution of each image in the plurality of training images to an optimization loss of the training process is weighted during the training process using the corresponding image debiasing weight value.

According to some embodiments, a system for training a generative image model comprises: a processor and a non-transitory computer readable medium storing a set of instructions, which when executed by the processor, configure the processor to: define a plurality of sensitive categories associated with a plurality of training images; define a plurality of protected attributes associated with the plurality of training images; determine, for a particular sensitive category, a distribution of at least one protected attribute within the plurality of training images; based on the distribution, calculate for each image in the plurality of training images a corresponding image debiasing weight value associated with the at least one protected attribute; generate annotated training data comprising the plurality of training images and further comprising, for each image in the plurality of training images, (1) the corresponding image debiasing weight value associated with the at least one protected attribute and (2) a corresponding descriptive text caption; and perform a training process using the annotated training data to train a generative image model resulting in a trained model, wherein a contribution of each image in the plurality of training images to an optimization loss of the training process is weighted during the training process using the corresponding image debiasing weight value.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments.

Figure 1:
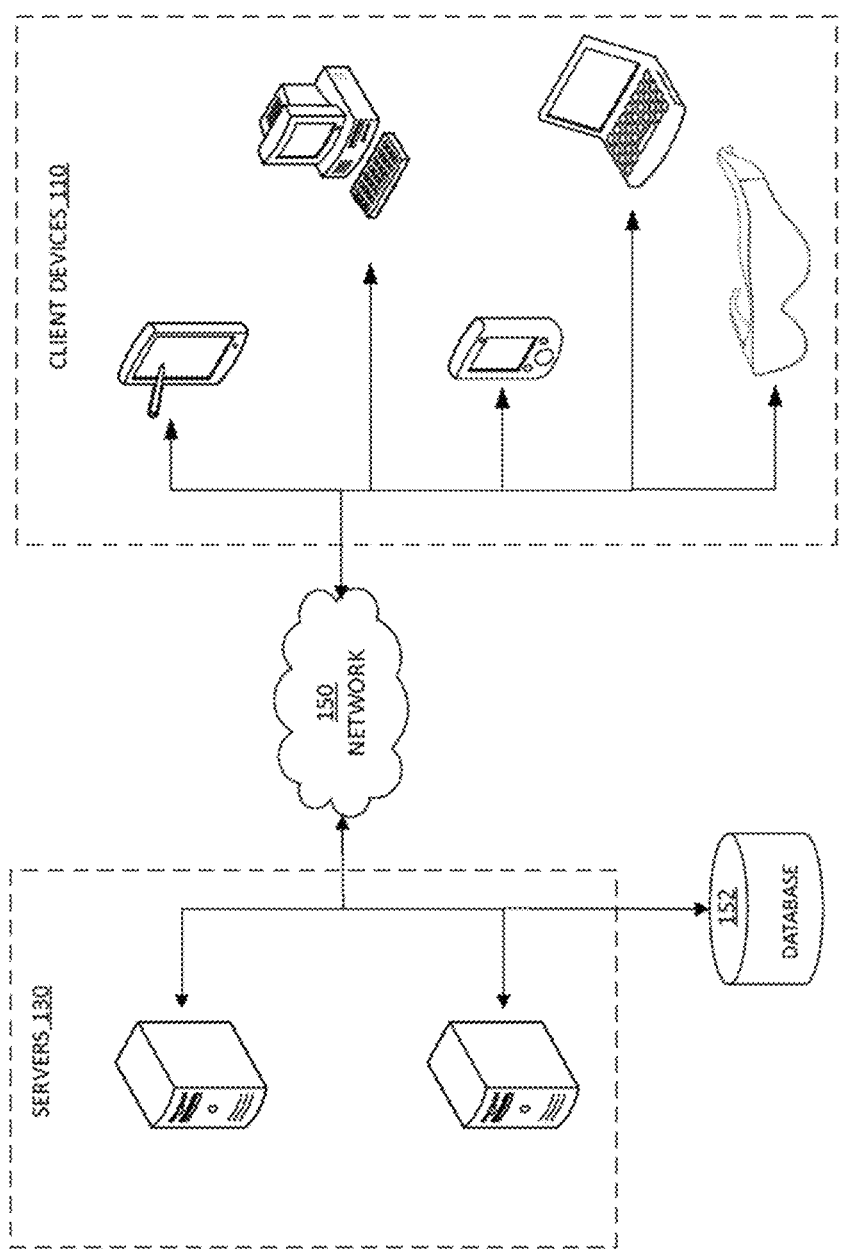
FIG. 1 illustrates a network architecture used to implement model training, according to some embodiments.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

All references cited anywhere in this specification, including the Background and Detailed Description sections, are incorporated by reference as if each had been individually incorporated.

The term "sensitive category" as used herein refers, according to some embodiments, to categories of people that are subject to stereotypes, such as but not limited to personalities, actions, income levels, and occupations. For example, personalities may include but are not limited to fun, angry, depressed, etc. Actions may include running, speaking, etc. Income levels may be qualitatively defined by relative descriptions such as low-income, high-income, etc., or quantitatively defined according to salary amounts or ranges. Occupations may include, but are not limited to, higher-paying occupations such as architects, lawyers, corporate executives (CEO, etc.), politicians, judges, engineers, doctors, and the like, and/or lower-paying occupations such as teachers, housekeepers, cashiers, janitors, dishwashers, fast-food workers, retail workers, social workers, etc. Occupations may also be of a criminal nature, including but not limited to inmates, prisoners, drug dealers, terrorists, and the like.

The term "protected attribute" as used herein refers, according to some embodiments, to attributes of people which are the basis for applying stereotypes and biases, and which are often protected against discrimination by law. Protected attributes may include, but are not limited to, gender, skin color (e.g., quantitatively characterized by a metric such as the Fitzpatrick Skin Scale, qualitatively characterized by relative descriptions such as shades of "light" or "dark," etc.), race, ethnicity, age, religion, and the like.

The term "generative image models" as used herein refers, in some embodiments, to artificial intelligence-based models designed to generate high-quality images based on text or image inputs. These models employ various techniques including, but not limited to, diffusion models, generative adversarial networks (GANs), variational autoencoders (VAEs), autoregressive models, and transformer-based architectures.

The term "loss function" as used herein refers, according to some embodiments, to mathematical functions that are used in the training of generative image models. These functions quantify the discrepancy between the model's predictions and the ground truth to guide the optimization process, enabling the trained model to generate realistic and diverse samples. Examples of loss functions for generative image models include, but are not limited to, mean squared error (MSE), cross-entropy, Wasserstein distance, and Kullback-Leibler (KL) divergence. By optimizing model parameters based on these loss functions, the model can generate images that align with real data, improving the model's ability to create realistic and high-quality images in generative AI applications.

The term "reconstruction loss" may be equivalently used herein to refer to the discrepancy between the model's predictions and the ground truth during a single iteration of the training process.

The term "optimization loss" as used herein refers, according to some embodiments, to an overall objective of minimizing the discrepancy being measured by the loss function to improve the model's performance. In other words, the loss function evaluates individual predictions and guiding model adjustments, and the optimization loss seeks to minimize error across the entire training dataset, by iteratively adjusting model parameters during training.

FIG. 1 illustrates a network architecture 100 used to implement model training, according to some embodiments. The network architecture 100 may include servers 130 and a database 152, communicatively coupled with multiple client devices 110 via a network 150. Client devices 110 may include, but are not limited to, laptop computers, desktop computers, and the like, and/or mobile devices such as smart phones, palm devices, video players, headsets, tablet devices, and the like.

The network 150 may include, for example, any one or more of a local area network (LAN), a wide area network (WAN), the Internet, and the like. Further, the network 150 may include, but is not limited to, any one or more of the following network topologies, including a bus network, a star network, a ring network, a mesh network, a star-bus network, tree or hierarchical network, and the like.

Figure 2:
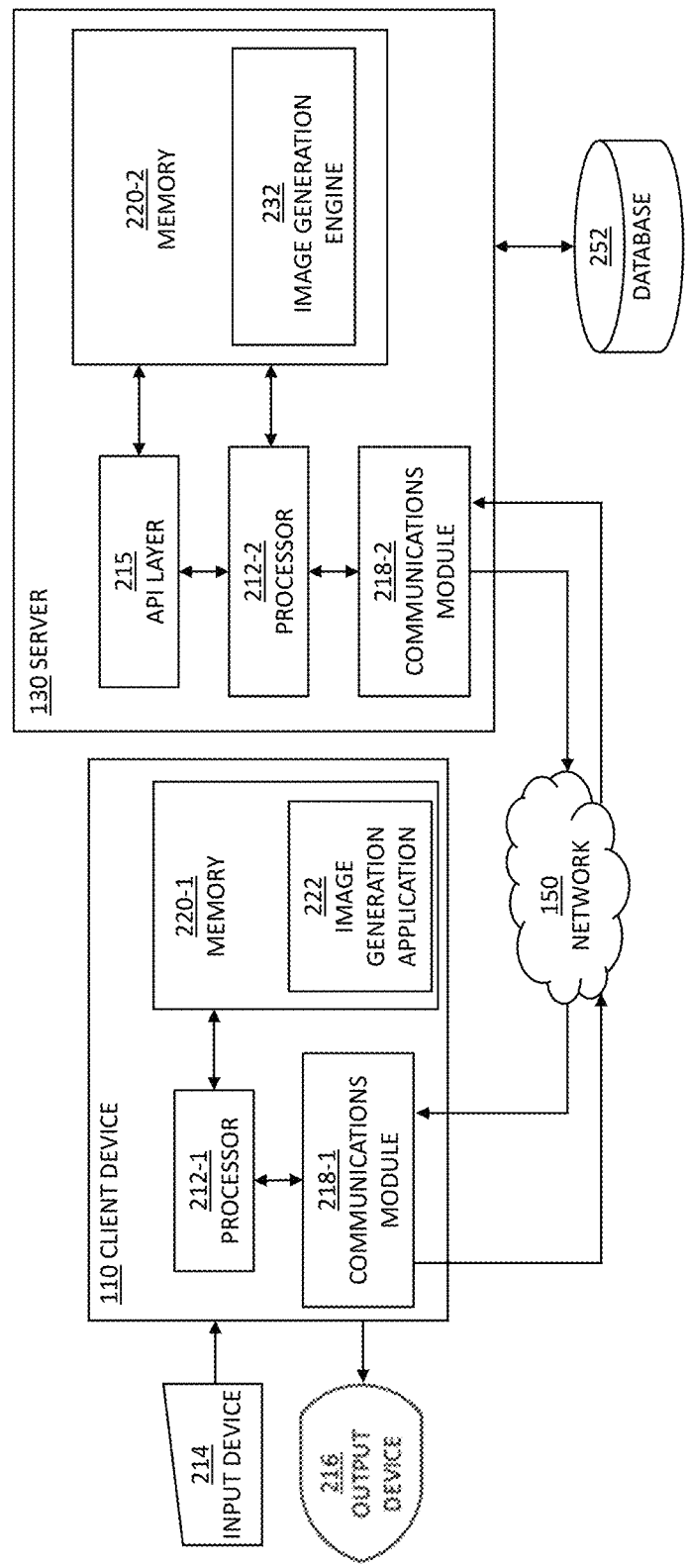
FIG. 2 is a block diagram illustrating details of a system for model training, according to some embodiments.

FIG. 2 is a block diagram illustrating details of a system 200 for model training having at least one client device 110, at least one server 130, and a network architecture 100 as disclosed herein, according to some embodiments. Client device 110 and server 130 are communicatively coupled over network 150 via respective communications modules 218-1 and 218-2 (hereinafter, collectively referred to as "communications modules 218"). Communications modules 218 are configured to interface with network 150 to send and receive information, such as requests, uploads, messages, and commands to other devices on the network 150. Communications modules 218 can be, for example, modems or Ethernet cards, and may include radio hardware and software for wireless communications (e.g., via electromagnetic radiation, such as radiofrequency (RF), near field communications (NFC), Wi-Fi, and Bluetooth radio technology). Client device 110 may be coupled with an input device 214 and with an output device 216. A user may interact with client device 110 via the input device 214 and the output device 216. Input device 214 may include a mouse, a keyboard, a pointer, a touchscreen, a microphone, a joystick, a virtual joystick, a touch-screen display that a user may use to interact with client device 110, or the like. In some embodiments, input device 214 may include cameras, microphones, and sensors, such as touch sensors, acoustic sensors, inertial motion units and other sensors configured to provide input data to a VR/AR headset. Output device 216 may be a screen display, a touchscreen, a speaker, and the like.

Client device 110 may also include a processor 212-1, configured to execute instructions stored in a memory 220-1, and to cause client device 110 to perform at least some operations in methods consistent with the present disclosure. Memory 220-1 may further include an image generation application 222, configured to run in client device 110 and couple with input device 214 and output device 216. The image generation application 222 may be downloaded by the user from server 130, and/or may be hosted by server 130. The image generation application 222 includes specific instructions which, when executed by processor 212-1, cause operations to be performed according to methods described herein. In some embodiments, the image generation application 222 runs on an operating system (OS) installed in client device 110. In some embodiments, image generation application 222 may run within a web browser. In some embodiments, the processor 212-1 is configured to control a graphical user interface (GUI) for the user of one of client devices 110 accessing the server 130.

Database 152 may store data and files associated with the server 130 from the image generation application 222. In some embodiments, client device 110 collects data, including but not limited to video and images, for upload to server 130 using image generation application 222, to store in the database 152.

Server 130 includes a memory 220-2, a processor 212-2, and communications module 218-2. Hereinafter, processors 212-1 and 212-2, and memories 220-1 and 220-2, will be collectively referred to, respectively, as "processors 212" and "memories 220." Processors 212 are configured to execute instructions stored in memories 220. In some embodiments, memory 220-2 includes an image generation engine 232. The image generation engine 232 may be configured to perform operations and methods according to aspects of embodiments. The image generation engine 232 may share or provide features and resources with the client device, including multiple tools associated with data, image, video collection, capture, or applications that use data, images, or video retrieved with image generation engine 232 (e.g., image generation application 222). The user may access the image generation engine 232 through the image generation application 222, installed in a memory 220-1 of client device 110. Accordingly, image generation application 222 may be installed by server 130 and perform scripts and other routines provided by server 130 through any one of multiple tools. Execution of image generation application 222 may be controlled by processor 212-1.

Figure 3:
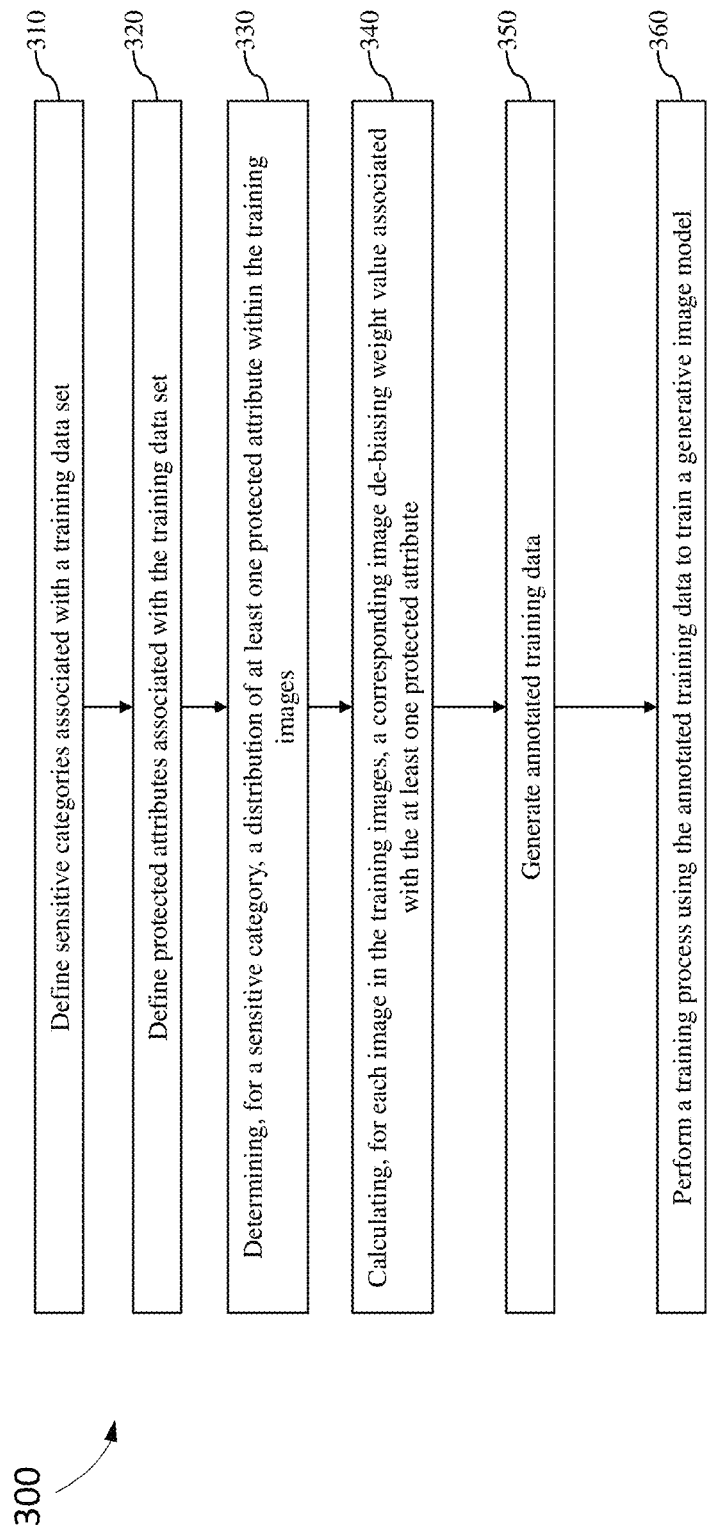
FIG. 3 is a flowchart illustrating a process for model training, according to some embodiments.

FIG. 3 is a flowchart illustrating a process 300 for model training performed by a client device (e.g., client device 110, etc.) and/or a client server (e.g., server 130, etc.), according to some embodiments. In some embodiments, one or more operations in process 300 may be performed by a processor circuit (e.g., processors 212, etc.) executing instructions stored in a memory circuit (e.g., memories 220, etc.) of a system (e.g., system 200, etc.) as disclosed herein. For example, operations in process 300 may be performed by image generation application 222, image generation engine 232, or some combination thereof. Moreover, in some embodiments, a process consistent with this disclosure may include at least operations in process 300 performed in a different order, simultaneously, quasi-simultaneously, or overlapping in time. The process 300 will be further described with reference to the example of FIGS. 4 to 8, which are described further below.

At 310, the process 300 defines sensitive categories associated with a training data set. The sensitive categories may include, but are not limited to, personalities, actions, income levels, and occupations. At 320, the process 300 defines protected attributes associated with the training data set. The protected attributes may include, but are not limited to, gender, skin color, ethnicity, race, age, and religion. In some embodiments, the training data set includes multiple training images, which may be annotated with tags and/or metadata (e.g., stored in header fields of the images, stored as separate files in the training data and associated with the images, etc.).

Figure 4:
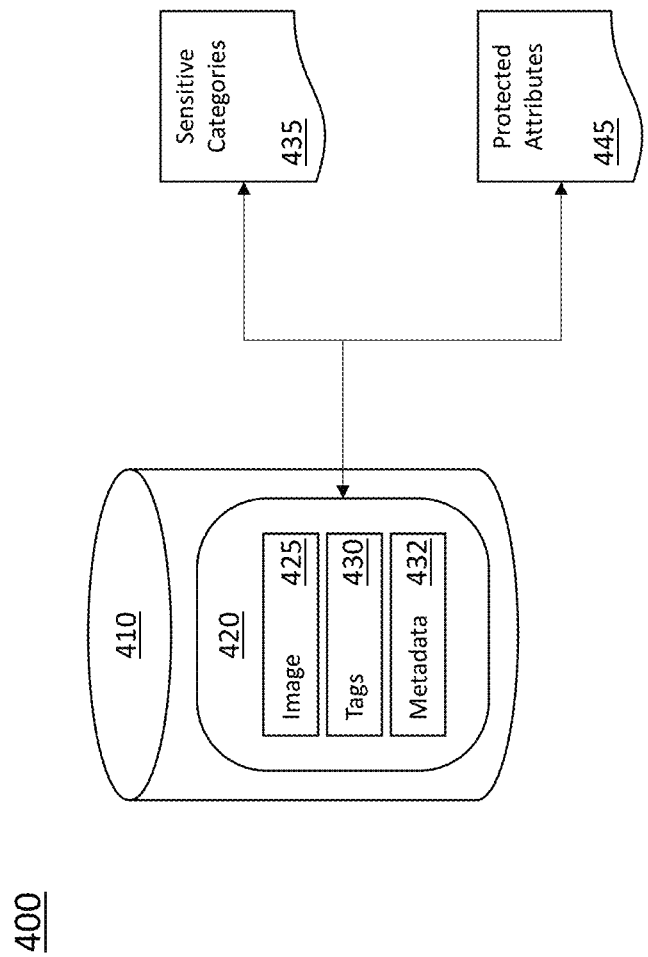
FIG. 4 shows an example of defining sensitive image categories and protected attributes in a training data set, according to some embodiments.

FIG. 4 shows an example 400 of defining sensitive image categories and protected attributes in a training data set, according to some embodiments. The training data set 410 includes multiple annotated images, of which a sample annotated image 420 is shown. The annotated image 420 includes the image data 425, tags 430, and other metadata 432. These tags 430 and metadata 432 may be used to define relevant sensitive categories 435 and protected attributes 445 for each image. Alternatively, predefined sensitive categories 435 and protected attributes 445 may be used to annotate the annotated image 420 using tags and/or metadata. Bidirectional arrows are shown between the annotated image 420 and the sensitive categories 435 and protected attributes 445, indicating that the latter may be predefined and used to annotate the images, or that they may be defined from the images.

For example, in some embodiments, the sensitive categories 435 and/or the protected attributes 445 may be manually pre-defined. The sensitive categories 435 and/or the protected attributes 445 may then be used to tag or annotate the images in the training data set 410, using either a manual process, or an automated or semi-automated process (not shown) that provides the training images to an image classifier and determines which sensitive categories 435 and/or the protected attributes 445 are applicable to each image.

As another example, in other embodiments, automated models may be used to identify the sensitive categories 435 and/or the protected attributes 445 inherently represented by the images in the training data set 410. For example, the sensitive categories 435 and/or protected attributes 445 may be extracted by an automated or semi-automated process (not shown) that provides the training images to an image classifier, that returns one or more category and/or attribute labels associated with each training image. The labels may then be used to annotate each annotated image 420 with tags and/or metadata, which are used to define the sensitive categories 435 and/or the protected attributes 445.

At 330, the process 300 determines, for a sensitive category, a distribution of at least one protected attribute within the plurality of training images that are representative of that sensitive category. In some embodiments, if there are multiple sensitive categories within the training data, then a distribution may be calculated for each sensitive category/protected attribute pair.

In some embodiments, a distribution debiasing weight value is calculated from the distribution that balances a particular bias associated with a sensitive category/protected attribute pair. The distribution debiasing weight value may be, for example, a scalar value that represents an imbalance ratio across all training images in the training data set 410, between the sensitive category and a reference category (e.g., between male and female, between light skin color and dark skin color, and the like).

At 340, the process 300 calculates, for each image in the plurality of training images, a corresponding image debiasing weight value associated with the at least one protected attribute. The image debiasing weight values are used during training to counter the biases in the distributions of the training data set 410.

The image debiasing weight values may be computed with different techniques. In some embodiments, for each training image in the training data set 410 that is characterized by the protected attribute, the distribution debiasing weight value may be used to calculate the corresponding image debiasing weight value. For example, for an image characterized by a single category/attribute pair, the image debiasing weight value may simply be equal to the distribution debiasing weight value or be equal to the distribution debiasing weight value multiplied by some scaling factor. For an image characterized by multiple protected attributes, the image debiasing weight value may be an average of the distribution debiasing weight values corresponding to those protected attributes. Techniques to compute the image debiasing weight values are not limited to these examples.

Figure 5:
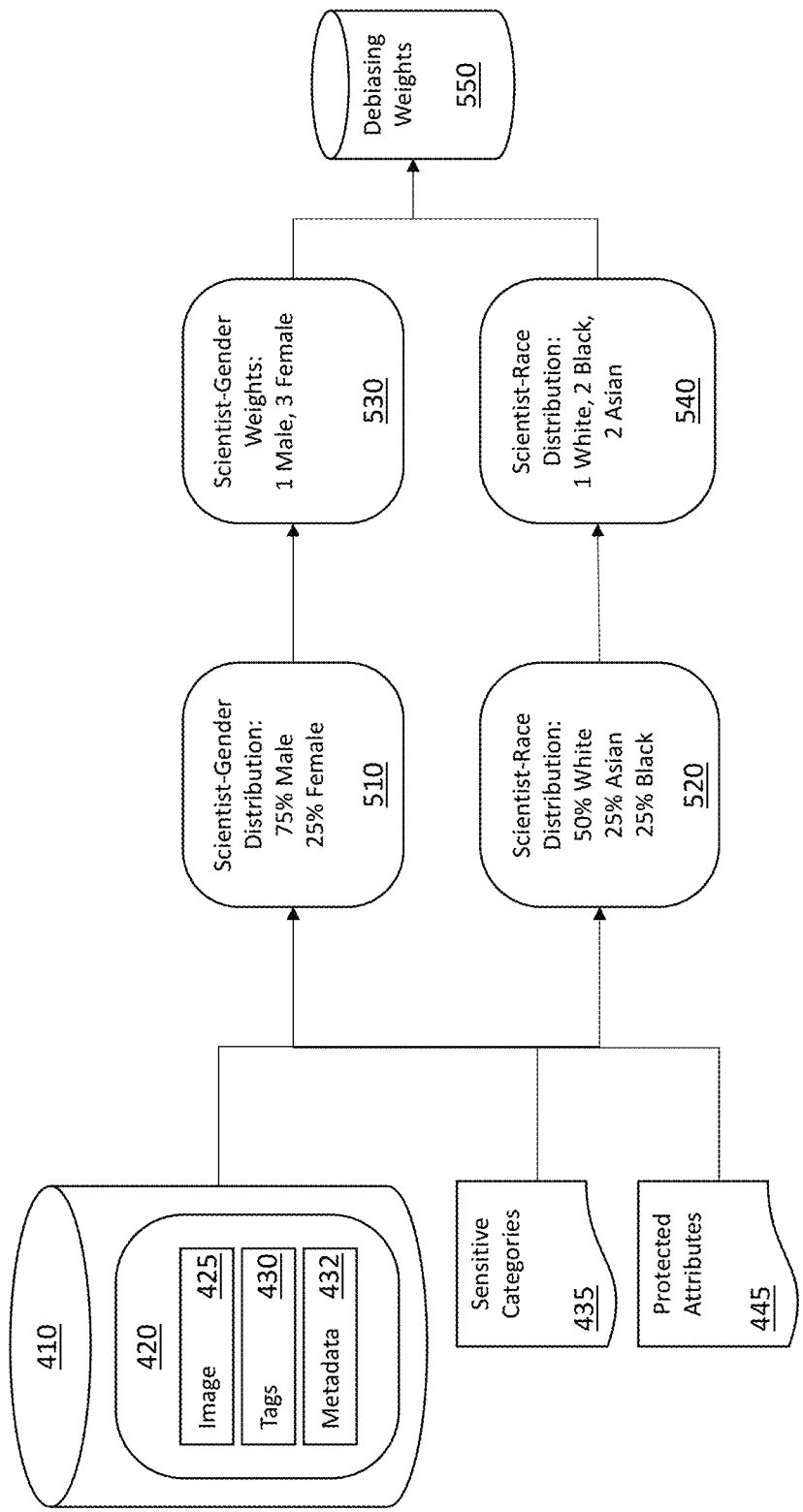
FIG. 5 shows an example of determining a distribution of protected attributes within training images and calculating distribution debiasing weights for each sensitive category and protected attribute pair, according to some embodiments.

FIG. 5 shows an example 500 of determining a distribution of protected attributes within training images and calculating distribution debiasing weights for each sensitive category and protected attribute pair, according to some embodiments. This example 500 may continue, for example, the embodiment shown in FIG. 4.

The training data set 410 is analyzed to determine which sensitive categories 435 and protected attributes 445 are represented in the training images therein. The analysis may include, for example, analyzing each image data 425 and the corresponding tags 430 and/or metadata 432, tallying the relative number of images that are represented by each sensitive category 435 and protected attribute 445, and determining ratios thereof. In this example, the training data set 410 is found to be represented by a "Scientist" category and protected attributes for race and gender. The example 500 of FIG. 5 is a non-limiting, simplified example for illustrative purposes. However, training data set 410 may generally have multiple other types of sensitive categories and protected attributes, as described above.

In the simplified example 500 of FIG. 5, based on the analysis of the training data set 410, an attribute distribution 510 of male and female classes in the scientist category is determined to be 75% Male and 25% Female. An attribute distribution 520 of races in the scientist category is determined to be 50% White, 25% Black, and 25% Asian.

Knowing these attribute distributions, s for each sensitive category and protected attribute pair may be computed. Weights may be computed relative to the most represented protected attribute 445 in a given sensitive category. To rectify the gender imbalance in the gender distribution for the scientist category, distribution debiasing weight values 530 for the Scientist-gender category/attribute pair are defined as: Male gender weight=1 (as the most represented gender) and Female gender weight=3 (as the less represented gender). Likewise, to rectify the race imbalance in the racial distribution for the scientist category, distribution debiasing weight values 540 are defined for the Scientist-race category/attribute pair are defined as: White race weight=1 (as the most represented race), Black race weight=2, and Asian weight=2 (as the less-represented races). In this example, the distribution debiasing weight values 530, 540 are scalar values, but in other embodiments may be represented as any numerical type, including but not limited to scalar values, floating point values, ratios, percentages, and the like.

The distribution debiasing weight values 530, 540 characterize the training data set 410 as a whole, and not any individual annotated image 420. The distribution debiasing weight values 530, 540 may be stored in a storage 550 for use in the annotation process, which is described below. The storage 550 may be the same storage used to store the training data set 410, or a different storage.

At 350, the process 300 generates annotated training data. In some embodiments, the annotated training data includes the training images, and for each image in the plurality of training images, also includes the corresponding image debiasing weight value associated with the at least one protected attribute, as well as a corresponding descriptive text caption. In some embodiments, the image debiasing weight values are stored as metadata tags in their respective images in the training data. In some embodiments, the descriptive text captions are also stored as a metadata tag in their respective images in the training data.

Figure 6:
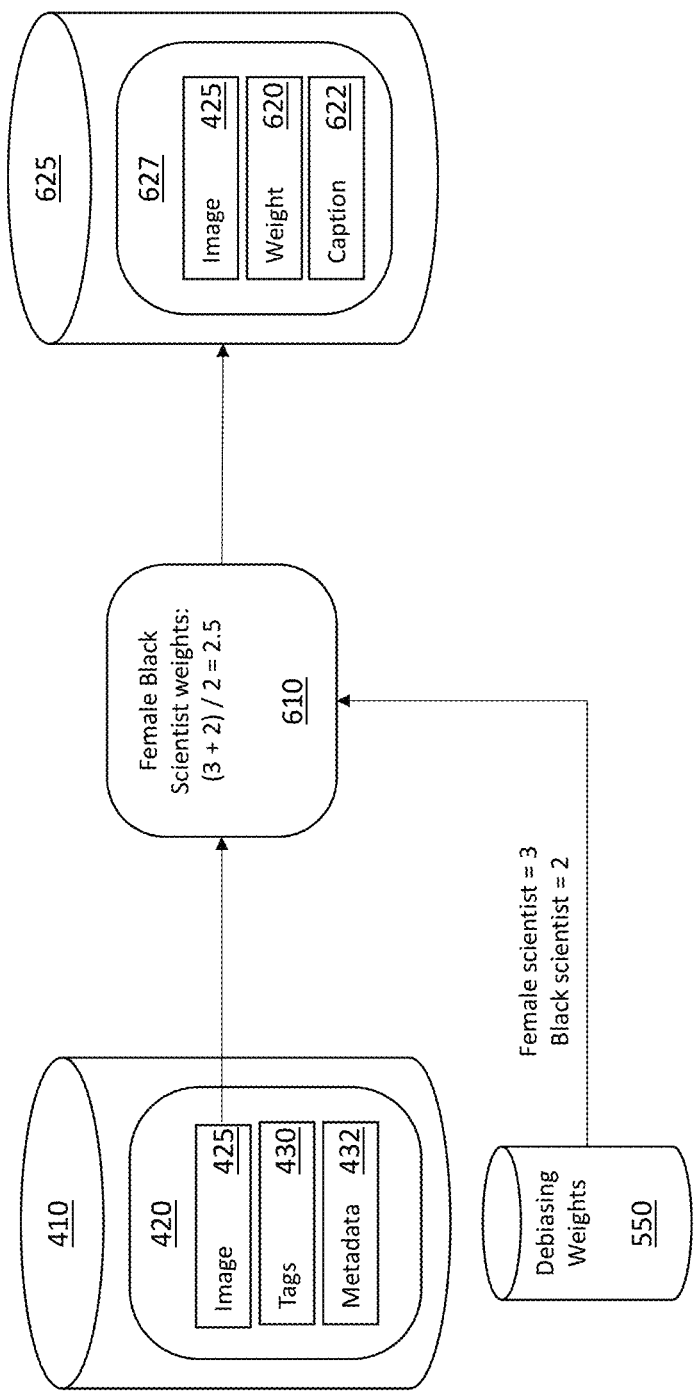
FIG. 6 shows an example of calculating image debiasing weight values, according to some embodiments.

FIG. 6 shows an example 600 of calculating image debiasing weight values, according to some embodiments. This example 600 may continue, for example, the embodiments shown in FIG. 4 and/or FIG. 5. In this example, for a given annotated image 420 in the training data set 410, a distribution debiasing weight value for each category/attribute pair relevant to the annotated image 420 is retrieved from the storage 550 and used to calculate the corresponding image debiasing weight value 610. The image debiasing weight value 610 is then stored a training weight value 620 alongside the image data 425. In this example, a weighted training data set 625 is created that, for each training image 627, stores the corresponding image data 425 and the training weight value 620. The weighted training data set 625 may also store additional information relevant to the training process (described below), such as a text caption 622 describing the image data 425. Alternatively, the training weight value 620 may be added to the training data set 410, in which case each training image 627 is the original annotated image 420, and the training weight value 620 is included with the tags 430, metadata 432, or a new data field.

In the example 600 of FIG. 6, the image debiasing weight value 610 is computed as the average of the weights of the two category/attribute pairs represented in the image. Here the image data 425 may depict a female black scientist, and therefore be assigned an image debiasing weight value of 2.5, which is the average of the image debiasing weight values for the scientist-female pair (3) and the scientist-black pair (2). In this example, the image debiasing weight value 610 is a non-integer value, but in other embodiments may be represented as any numerical type, including but not limited to scalar values, floating point values, ratios, percentages, and the like.

In some embodiments, for images that are characterized by multiple protected attributes, attribute distributions may also be computed as a category/attribute 1/attribute 2 triplet, though the number of potential permutations may become very large in such scenarios. The training data set 410 may be analyzed to determine how many categories and attributes are represented, and certain pairs or triplets prioritized.

In some embodiments, a single category and a single attribute may be held fixed as a single category, and the second attribute be treated as a variable. For example, using the embodiments described above with respect to FIGS. 4-6, "female scientist" may be used as the sensitive category and "race" as the protected attribute, with the attribute distribution, the distribution debiasing weight value, and the image debiasing weight values computed accordingly. The analysis may then be repeated for "black scientist" as the sensitive category and "gender" as the protected attribute.

At 360, the process 300 includes performing a training process using the annotated training data to train a generative image model, such that the contribution of each image in the plurality of training images to an optimization loss of the training process is weighted during the training process using the corresponding image debiasing weight value. As a result, each protected attribute has the same contribution to the learning process within each sensitive category.

Figure 7:
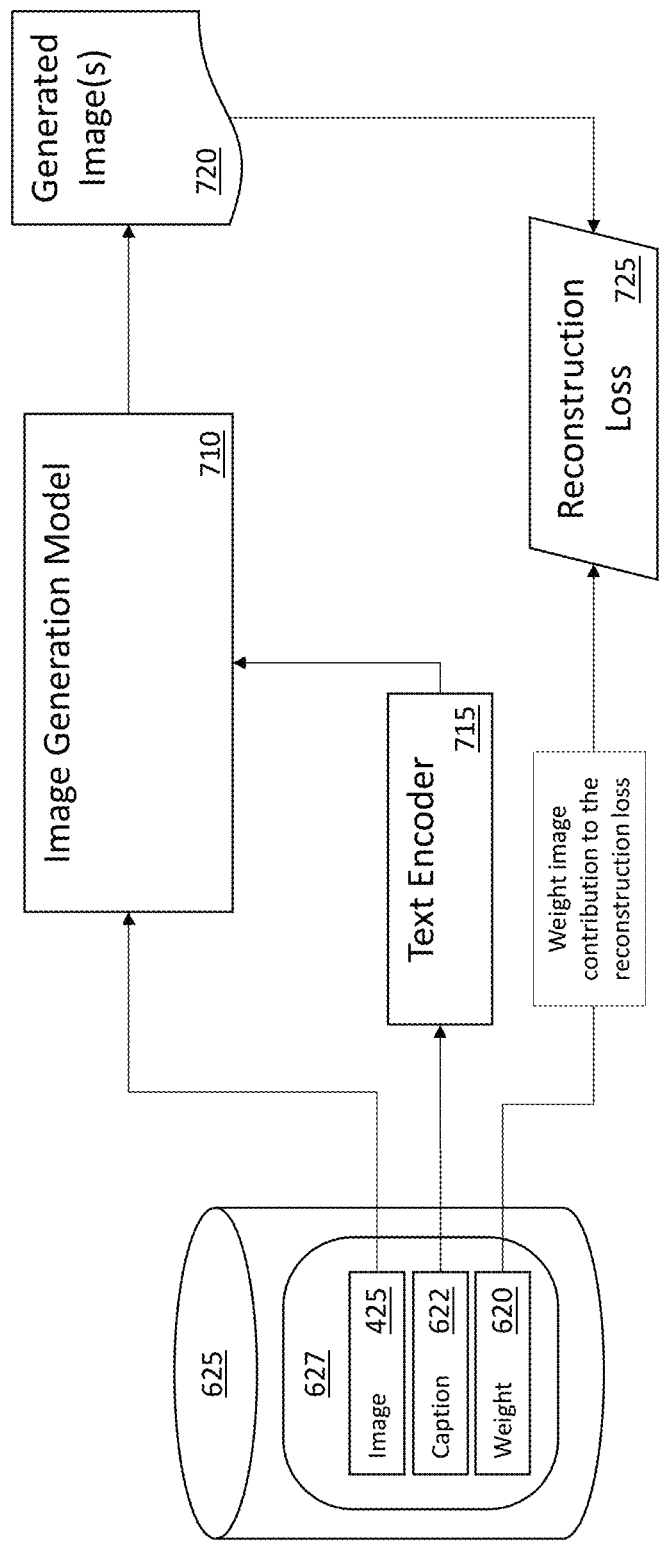
FIG. 7 shows an example of training an image generation model using weighted image contributions, according to some embodiments.

FIG. 7 shows an example 700 of training an image generation model using weighted image contributions, according to some embodiments. This example 700 may continue, for example, the embodiments shown in FIG. 4, FIG. 5, and/or FIG. 6.

In this example 700, the weighted training data set 625 is used to train an image generation model 710, by providing (as training inputs) multiple training images 627, each including image data 425 and a text caption 622 (encoded by a text encoder 715). The image generation model 710 outputs one or more generated images, which are then compared to the ground truth images using a loss function (not shown).

The image generation model 710 may be any type of model, including but not limited to a Generative Adversarial Network (GAN), a Variational Autoencoder (VAE), autoregressive models, diffusion models, transformer-based architectures, and the like.

A reconstruction loss is computed using the loss function and used to optimize the variables of the image generation model 710. The weighted training data set 625 also includes the training weight value 620, which is used to weight the contribution of the image data 425 to the reconstruction loss. The training process results in a debiased image generation model, with respect to the category/attribute pairs of interest.

Figure 8:
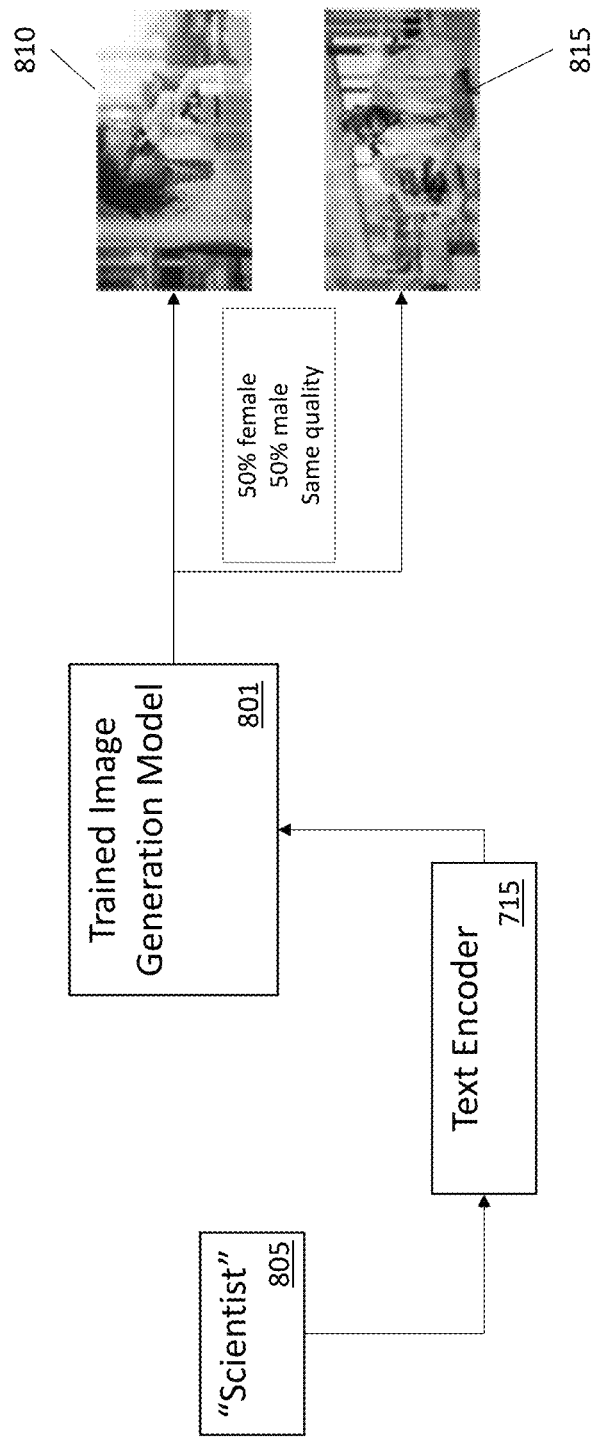
FIG. 8 shows an example of a debiased image generation model, according to some embodiments.

FIG. 8 shows an example 800 of a debiased image generation model, according to some embodiments. This example 800 may continue, for example, the embodiments shown in FIG. 4, FIG. 5, and/or FIG. 6.

In this example 800, a debiased image generation model 801 may be provided as an input a text prompt 805 that includes a description of a sensitive category (in this example, "Scientist"), and create output images 810, 815 that depict or represent that sensitive category. However, the output images 810, 815 have an unbiased distribution of the protected attribute for the sensitive category, unlike the training data set 410, which had a biased distribution of the protected attribute for the sensitive category.

In the resulting debiased image generation model 801, the influence of protected attributes classes has been balanced for each sensitive category. For example, the model has learned to generate images of female and male scientists equally. When asked to generate a "scientist" image without indication of the gender (as in the text prompt 805), the output images 810, 815 are not biased towards male or female scientists.

Many of the above-described features and applications may be implemented as software processes that are specified as a set of instructions recorded on a computer-readable storage medium (alternatively referred to as computer-readable media, machine-readable media, or machine-readable storage media). When these instructions are executed by one or more processing unit(s) (e.g., one or more processors, cores of processors, or other processing units), they cause the processing unit(s) to perform the actions indicated in the instructions. Examples of computer-readable media include, but are not limited to, RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra-density optical discs, any other optical or magnetic media, and floppy disks. In one or more embodiments, the computer-readable media does not include carrier waves and electronic signals passing wirelessly or over wired connections, or any other ephemeral signals. For example, the computer-readable media may be entirely restricted to tangible, physical objects that store information in a form that is readable by a computer. In one or more embodiments, the computer-readable media is non-transitory computer-readable media, computer-readable storage media, or non-transitory computer-readable storage media.

In one or more embodiments, a computer program product (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

While the above discussion primarily refers to microprocessor or multi-core processors that execute software, one or more embodiments are performed by one or more integrated circuits, such as application specific integrated circuits (ASICs) or field programmable gate arrays (FPGAs). In one or more embodiments, such integrated circuits execute instructions that are stored on the circuit itself.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way), all without departing from the scope of the subject technology.

It is understood that any specific order or hierarchy of blocks in the processes disclosed is an illustration of example approaches. Based upon implementation preferences, it is understood that the specific order or hierarchy of blocks in the processes may be rearranged, or that not all illustrated blocks be performed. Any of the blocks may be performed simultaneously. In one or more embodiments, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The subject technology is illustrated, for example, according to various aspects described above. The present disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

A reference to an element in the singular is not intended to mean "one and only one" unless specifically stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the disclosure.

To the extent that the terms "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments. In one aspect, various alternative configurations and operations described herein may be considered to be at least equivalent.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain. It is understood that some or all steps, operations, or processes may be performed automatically, without the intervention of a user.

Method claims may be provided to present elements of the various steps, operations, or processes in a sample order, and are not meant to be limited to the specific order or hierarchy presented.

In one aspect, a method may be an operation, an instruction, or a function and vice versa. In one aspect, a claim may be amended to include some or all of the words (e.g., instructions, operations, functions, or components) recited in other one or more claims, one or more words, one or more sentences, one or more phrases, one or more paragraphs, and/or one or more claims.

All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

The Title, Background, and Brief Description of the Drawings of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples, and the various features are grouped together in various embodiments for the purpose of streamlining the disclosure. This method of disclosure is not to be interpreted as reflecting an intention that the included subject matter requires more features than are expressly recited in any claim. Rather, as the claims reflect, inventive subject matter lies in less than all features of a single disclosed configuration or operation. The claims are hereby incorporated into the Detailed Description, with each claim standing on its own to represent separately patentable subject matter.

The claims are not intended to be limited to the aspects described herein but are to be accorded the full scope consistent with the language of the claims and to encompass all legal equivalents. Notwithstanding, none of the claims are intended to embrace subject matter that fails to satisfy the requirement of 35 U.S.C. § 101, 102, or 103, nor should they be interpreted in such a way.

Embodiments consistent with the present disclosure may be combined with any combination of features or aspects of embodiments described herein.

The invention claimed is:

1. A method for training a generative image model, comprising:
    defining a plurality of sensitive categories associated with a plurality of training images;
    defining a plurality of protected attributes associated with the plurality of training images;
    determining, for a particular sensitive category, a distribution of at least one protected attribute within the plurality of training images;
    based on the distribution, calculating for each image in the plurality of training images a corresponding image debiasing weight value associated with the at least one protected attribute;
    generating annotated training data comprising the plurality of training images and further comprising, for each image in the plurality of training images, (1) the corresponding image debiasing weight value associated with the at least one protected attribute and (2) a corresponding descriptive text caption; and
    performing a training process using the annotated training data to train a generative image model resulting in a trained model, wherein a contribution of each image in the plurality of training images to an optimization loss of the training process is weighted during the training process using the corresponding image debiasing weight value.

2. The method of claim 1, wherein the distribution of the at least one protected attribute within the plurality of training images is a biased distribution, and the method further comprises:
    providing as an input to the trained model a prompt comprising a description of the particular sensitive category; and
    receiving as an output from the trained model a plurality of output images associated with the particular sensitive category,
    wherein the plurality of output images has an unbiased distribution of the at least one protected attribute for the particular sensitive category.

3. The method of claim 1, wherein each image in the plurality of training images comprises metadata tags describing at least one sensitive category associated with the image.

4. The method of claim 1, wherein each training image in the annotated training data comprises the corresponding image debiasing weight value stored as a metadata tag.

5. The method of claim 1, wherein each training image in the annotated training data comprises the corresponding descriptive text caption stored as a metadata tag.

6. The method of claim 1, wherein calculating each corresponding image debiasing weight value based on the distribution comprises calculating from the distribution a bias weight value that characterizes a bias associated with the particular sensitive category and the at least one protected attribute.

7. The method of claim 1, wherein a particular image in the plurality of training images is characterized by a particular protected attribute, the method further comprising:
    calculating from the distribution a particular debiasing weight value that balances a particular bias associated with the particular sensitive category and the particular protected attribute; and
    calculating for the particular image the corresponding image debiasing weight value based on the particular debiasing weight value.

8. The method of claim 7, wherein the particular protected attribute is a first protected attribute, the particular debiasing weight value is a first debiasing weight value, the particular bias is a first bias, and the particular image is further characterized by a second protected attribute, the method further comprising:
    calculating from the distribution a second debiasing weight value that balances a second bias associated with the particular sensitive category and the second protected attribute;
    calculating for the particular image a corresponding second debiasing weight value based on the debiasing weight value; and
    calculating the corresponding image debiasing weight value by averaging the first debiasing weight value and the second debiasing weight value.

9. The method of claim 1, wherein the plurality of sensitive categories comprise a plurality of occupations.

10. The method of claim 1, wherein the plurality of sensitive categories comprise a plurality of income levels.

11. The method of claim 1, wherein the plurality of protected attributes comprise gender, skin color, ethnicity, race, age, and religion.

12. The method of claim 1, wherein the generative image model is one of a Generative Adversarial Network (GAN), a Variational Autoencoder (VAE), an autoregressive model, a diffusion model, and a transformer-based architecture.

13. A non-transitory computer-readable medium storing a program for training a generative image model, which when executed by a computer, configures the computer to:
    define a plurality of sensitive categories associated with a plurality of training images;
    define a plurality of protected attributes associated with the plurality of training images;
    determine, for a particular sensitive category, a distribution of at least one protected attribute within the plurality of training images;
    based on the distribution, calculate for each image in the plurality of training images a corresponding image debiasing weight value associated with the at least one protected attribute;
    generate annotated training data comprising the plurality of training images and further comprising, for each image in the plurality of training images, (1) the corresponding image debiasing weight value associated with the at least one protected attribute and (2) a corresponding descriptive text caption; and perform a training process using the annotated training data to train a generative image model resulting in a trained model, wherein a contribution of each image in the plurality of training images to an optimization loss of the training process is weighted during the training process using the corresponding image debiasing weight value.

14. The non-transitory computer-readable medium of claim 13, wherein the distribution of the at least one protected attribute within the plurality of training images is a biased distribution, and the program, when executed by the computer, further configures the computer to:
provide as an input to the trained model a prompt comprising a description of the particular sensitive category; and
receive as an output from the trained model a plurality of output images associated with the particular sensitive category,
wherein the plurality of output images has an unbiased distribution of the at least one protected attribute for the particular sensitive category.

15. The non-transitory computer-readable medium of claim 13, wherein calculating each corresponding image debiasing weight value based on the distribution comprises calculating from the distribution a bias weight value that characterizes a bias associated with the particular sensitive category and the at least one protected attribute.

16. The non-transitory computer-readable medium of claim 13, wherein a particular image in the plurality of training images is characterized by a particular protected attribute, and the program, when executed by the computer, further configures the computer to:
calculate from the distribution a particular debiasing weight value that balances a particular bias associated with the particular sensitive category and the particular protected attribute; and
calculate for the particular image the corresponding image debiasing weight value based on the particular debiasing weight value.

17. The non-transitory computer-readable medium of claim 16, wherein the particular protected attribute is a first protected attribute, the particular debiasing weight value is a first debiasing weight value, the particular bias is a first bias, and the particular image is further characterized by a second protected attribute, and the program, when executed by the computer, further configures the computer to:
calculate from the distribution a second debiasing weight value that balances a second bias associated with the particular sensitive category and the second protected attribute;
calculate for the particular image a corresponding second debiasing weight value based on the debiasing weight value; and
calculate the corresponding image debiasing weight value by averaging the first debiasing weight value and the second debiasing weight value.

18. The non-transitory computer-readable medium of claim 13, wherein the plurality of sensitive categories comprise one of a plurality of occupations and a plurality of income levels, and the plurality of protected attributes comprise gender, skin color, ethnicity, race, age, and religion.

19. The non-transitory computer-readable medium of claim 13, wherein the generative image model is one of a Generative Adversarial Network (GAN), a Variational Autoencoder (VAE), an autoregressive model, a diffusion model, and a transformer-based architecture.

20. A system for training a generative image model, comprising:
a processor; and
a non-transitory computer readable medium storing a set of instructions, which when executed by the processor, configure the processor to:
define a plurality of sensitive categories associated with a plurality of training images;
define a plurality of protected attributes associated with the plurality of training images;
determine, for a particular sensitive category, a distribution of at least one protected attribute within the plurality of training images;
based on the distribution, calculate for each image in the plurality of training images a corresponding image debiasing weight value associated with the at least one protected attribute;
generate annotated training data comprising the plurality of training images and further comprising, for each image in the plurality of training images, (1) the corresponding image debiasing weight value associated with the at least one protected attribute and (2) a corresponding descriptive text caption; and
perform a training process using the annotated training data to train a generative image model resulting in a trained model, wherein a contribution of each image in the plurality of training images to an optimization loss of the training process is weighted during the training process using the corresponding image debiasing weight value.

* * * * *